United States Patent [19]
Denham et al.

[11] 3,988,634
[45] Oct. 26, 1976

[54] CONTROLLED STORAGE LEVEL FOR A STORAGE CATHODE-RAY TUBE

[75] Inventors: Dan Franklin Denham, Portland; Lawrence Gerald Biggs, Beaverton, both of Oreg.

[73] Assignee: Tektronix, Inc., Beaverton, Oreg.

[22] Filed: Nov. 6, 1974

[21] Appl. No.: 521,321

Related U.S. Application Data

[63] Continuation-in-part of Ser. No. 365,395, June 30, 1973, abandoned.

[52] U.S. Cl. .............................. 315/13 ST; 328/124
[51] Int. Cl.² .................... H01J 29/50; H01J 31/00
[58] Field of Search ............... 315/13 ST; 328/121, 328/123, 124, 126

[56] References Cited
UNITED STATES PATENTS

| | | | |
|---|---|---|---|
| 2,822,467 | 2/1958 | Washburn, Jr. .................. | 328/124 |
| 3,595,996 | 7/1971 | Unger ................................ | 315/12 |
| 3,600,509 | 8/1971 | Gibson, Jr. ....................... | 315/13 ST |
| 3,831,054 | 8/1974 | Dorsey et al. .................... | 315/13 ST |

Primary Examiner—Maynard R. Wilbur
Assistant Examiner—T. M. Blum
Attorney, Agent, or Firm—Kenneth M. Durk

[57] ABSTRACT

A system employing electrical storage tube device and more particularly to scan conversion systems in which stored electrical data is erased and replaced with new electrical data wherein the improvement comprises means for controlling the fading or rate of erasure of the stored electrical data when the storage tube device employs a single electron gun for purposes of reading, erasing, and writing.

5 Claims, 5 Drawing Figures

Fig—1

CONTROLLED STORAGE LEVEL FOR A STORAGE CATHODE-RAY TUBE

CROSS-REFERENCE TO RELATED APPLICATION

This is a continuation-in-part of application Ser. No. 365,395 filed June 30, 1973, now abandoned.

BACKGROUND OF THE INVENTION

In scan conversion systems having a storage cathode-ray tube of the type employing a single electron gun, hereinafter referred to as storage tube, the electron gun must be used for reading, erasing, and writing. Present scan conversion systems employ the read scan raster for erasing and discontinue reading during erase time. Another method employs destructive readout during the read time causing the scanned area to erase over a period of several milliseconds. In the latter method, the area scanned and viewed on a monitor device is erased in a controlled manner.

In U.S. Pat. No. 3,088,048 means are fully described whereby the persistence of the image is electrically controlled using a separate viewing or reading gun for a direct storage tube i.e., electronic storage system for presenting a series of applied electrical signals as a corresponding series of visual images, each of the visual images persisting until converted into the immediately succeeding visual image.

SUMMARY OF INVENTION

The present invention overcomes the disadvantages of the prior art in that time sharing, as fully described in U.S. Pat. No. 3,595,996 and assigned to the assignee of the present invention, of read, erase, and write is accomplished using a single electron gun whereby the illusion of all three operations are occuring simultaneously and having either controlled or complete erasure is employed.

Accordingly, a storage tube is employed for storing an image corresponding to input information. The image is scanned, raster fashion by an electron beam and means are coupled to the storage tube for detecting a readout signal corresponding to the image. The input signal is sampled at sampling times corresponding to horizontal retrace intervals, that is, the intervals between raster lines, and is employed at such times for writing the image on the storage surface. The image is written as information is received i.e., on a real time basis. This same procedure is followed not only throughout the horizontal retrace intervals, but also during the vertical retrace interval. The result is a stored image which is easily transmitted to remote monitor devices such as a television monitor. Further, employment of either the vertical or horizontal scan retrace time intervals may be used to erase; in short, that time in which no picture information is transmitted from the scan converter. Thus, there is no flicker or picture dropout while viewing as the retrace intervals are not normally viewed on a television type monitor. Hence, any portion of the image may be erased while viewing the entire storage surface on monitor devices. The erased area is therefore only restricted by the dimension of the storage surface and the amplitude of the erase scan signals. This allows portions of the image to fade or erase at a controlled rate while adjacent areas are retained for longer periods of time giving the illusion that the monitor device persistence is being varied.

It is therefore one object of the present invention to provide a storage tube scan conversion system having a single electron gun.

It is another object of the present invention to provide an improved scan conversion system whereby erasing or fading of any area of an image stored is provided while viewing both the erased and non-erased area of the image.

It is yet another object of the present invention to provide an improved scan conversion system whereby erasure of the image stored is controlled to create a variable persistence.

The subject matter of the present invention is particularly pointed out and distinctly claimed in the concluding portion of this specification. The invention, however, both to organization and method of operation, together with further advantages and objects thereof, may best be understood by reference to the following description taken in connection with the following drawings.

DRAWINGS

DETAILED DESCRIPTION

Figure 1:
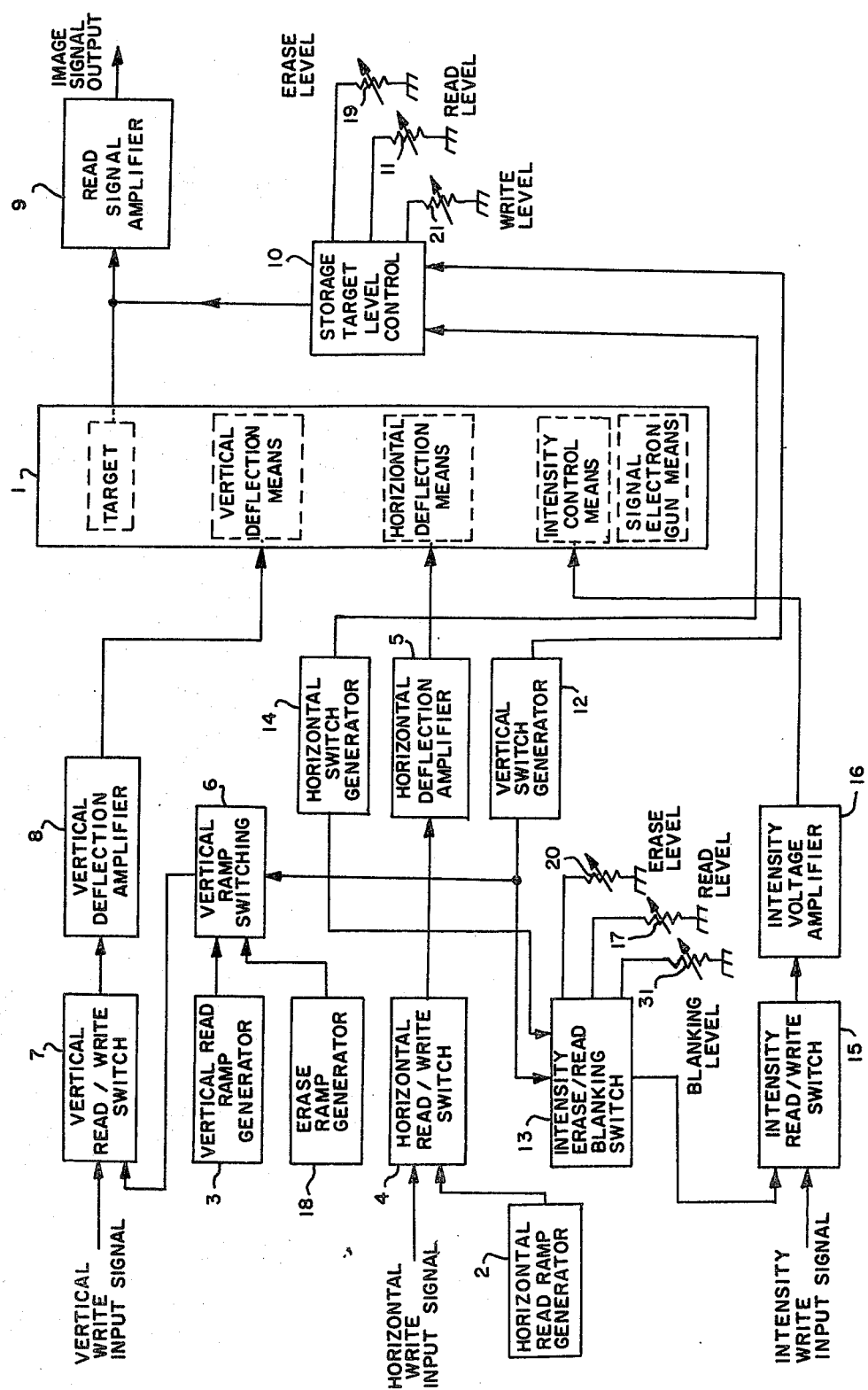
FIG. 1 is a block diagram of an image storage apparatus according to the present invention.

Referring to FIG. 1 of the drawings, the apparatus according to the present invention includes a Storage Tube 1. The storage tube is of the type employing a single electron gun for providing a cathode ray (i.e., beam electrons) for displaying a stored signal at different levels of brightness, the brightness dependent upon beam current and the time the beam remains on a particular storage element. Storage tube 1 of the present invention is a half-tone storage tube well known to those in the art and is of the electrical readout type whereby the tube has an electrical input and an electrical output. However, the storage tube can be a direct-viewing type whereby the tube has an electrical input and visual output.

Figure 3:
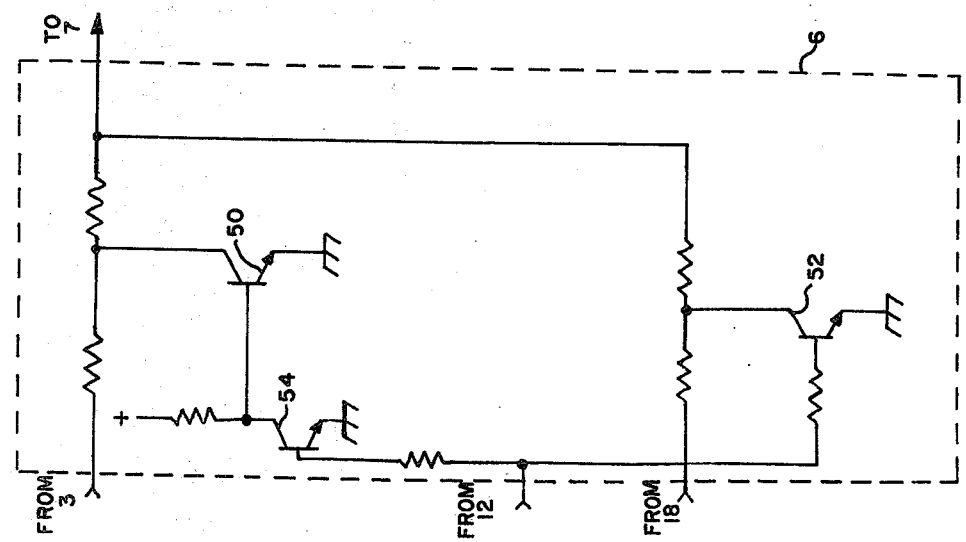
FIG. 3 is a schematic diagram of a typical circuit of block 6 according to FIG. 1.

Horizontal and vertical deflection means within storage tube 1 deflect an electron beam provided by single gun electron beam means within the tube are suitable connected to a scan raster generator comprising horizontal read ramp generator 2 and a vertical read ramp generator 3 for producing a raster scan of the target of storage tube 1 in the reading mode. Thus, during read operation, horizontal ramp generator 2 is connected to the horizontal deflection means of storage tube 1 via horizontal read/write switch 4 driving horizontal deflection amplifier 5, and vertical read ramp generator 3 is connected to the vertical deflection means of storage tube 1 via vertical ramp switching 6 and vertical read/write switch 7 driving vertical deflection amplifier 8. A raster signal in the form, for example, of a 60 Hertz sawtooth may be applied to the respective vertical deflection means from vertical read ramp generator 3, while a horizontal raster signal in the form of a 15,750 Hertz sawtooth may be applied to the respective horizontal deflection means from horizontal ramp generator 2. The resultant output of storage tube 1 would be an electrical signal which, when applied to read signal amplifier 9 for shaping, amplification, etc. would be an image signal, which if applied to a monitor device such as a television monitor would produce a raster comprising a plurality of substantially straight, e.g., horizontal, lines with a retrace interval between each line and the next on the monitor. The operation of, but not including the vertical ramp switching, the above circuits are well known and described in the already mentioned U.S. Pat. No. 3,595,996. Vertical ramp switching 6 can be, for example, the circuit shown in FIG. 3. The circuit consists of a plurality of transistors 50, 52, 54 and bias resistors connected so that either an input from vertical read ramp generator 3 or an input from erase ramp generator 18 is passed to the vertical read/write switch 7; the signal passed dependent upon the state of a control signal derived from vertical switch generator 12. Basically, when either transistor 50 or 52 conducts (saturates), one of the input signals is effectively grounded whilst the other is passed.

Figure 4:
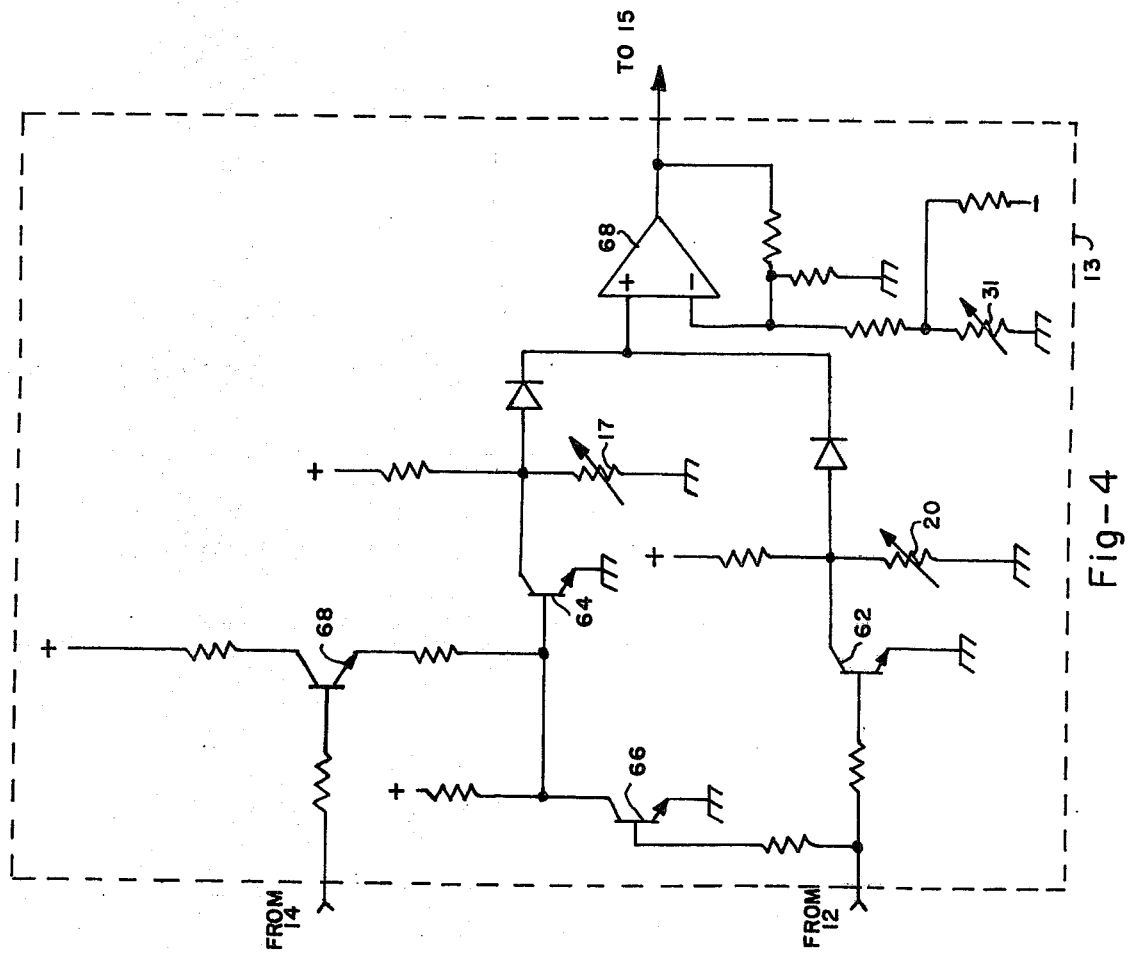
FIG. 4 is a schematic diagram of a typical circuit of block 13 according to FIG. 1.
Figure 5:
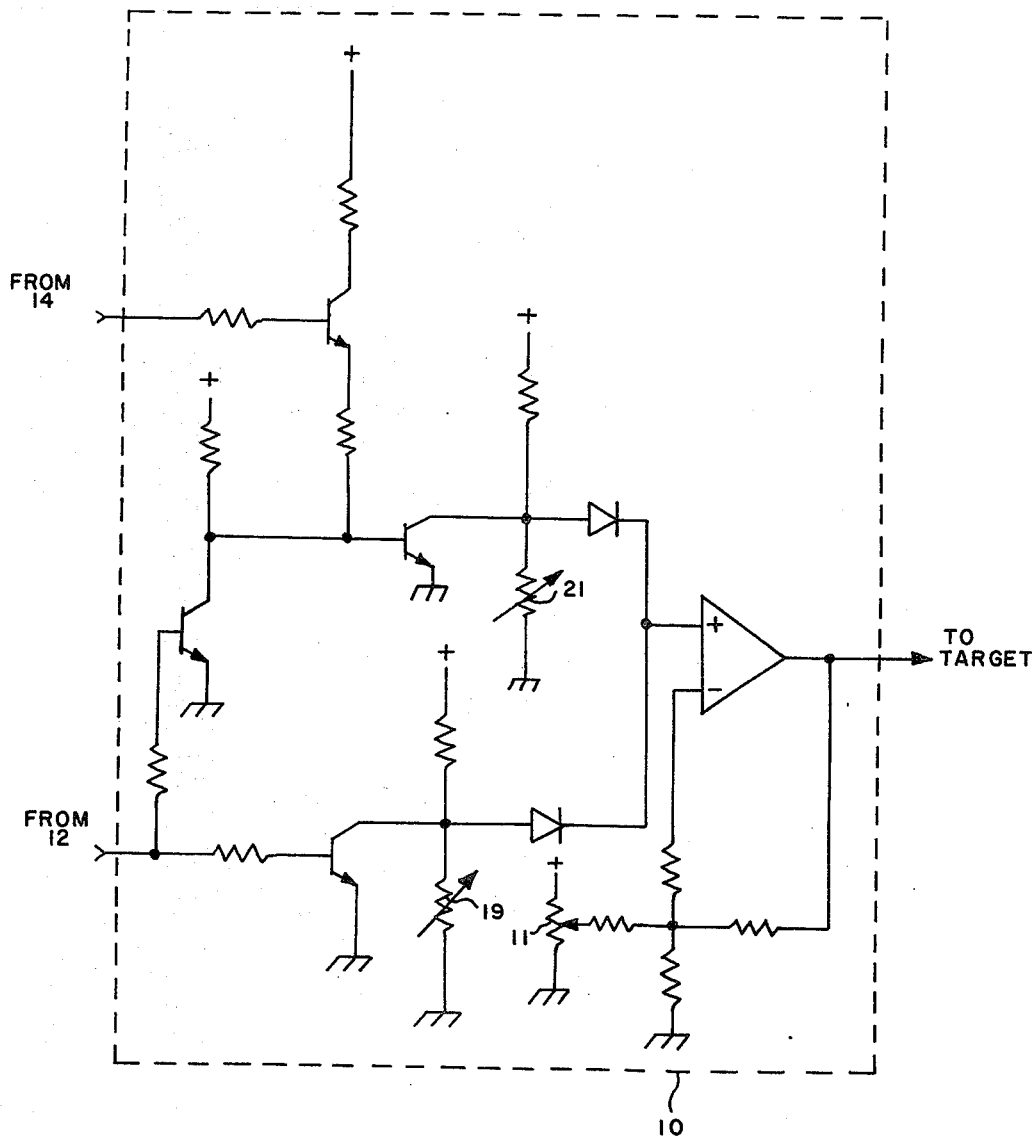
FIG. 5 is a schematic diagram of a typical circuit of block 10 according to FIG. 1.

In order to prevent the electron beam of storage tube 1 from causing the raster pattern to be stored on the target of the storage tube during read time, the target of storage tube 1 is set to a read level voltage by action of storage target level control 10. Simultaneously, an intensity control means within the storage tube 1 reduces the electron beam to a desired read level. Hence, during read time, storage target level control 10 produces a target potential which is applied to the target of storage tube 1, such potential to allow readout of the image on the storage target. A read level control 11 allows for varying the target potential a small amount during read time. Simultaneously, the intensity control means of storage tube 1 set to a read intensity level via intensity erase/read/blanking switch 13. Thus, intensity erase/read/blanking switch 13 under the control of vertical switch generator 12 and horizontal switch generator 14, used for providing horizontal and vertical timing, is connected to the intensity control of storage tube 1 via intensity read/write switch 15 driving intensity voltage amplifier 16 to control the intensity of the electron beam within storage tube 1. A read level control 17 allows for varying the intensity of the read electron beam. As can be discerned, the readout signal via read signal amplifier 9 is dependent upon the intensity of the electron beam and the storage target potential of the storage tube 1. The circuits of, but not including intensity erase/read/blanking switch 13 and storage target level control 10, the above are well known and described in the already mentioned U.S. Pat. No. 3,595,996. Intensity erase/read/blanking switch 13 can be, for example, the circuit shown in FIG. 4. The circuit consists of a plurality of transistors 60, 62, 64, 66 and a conventional operational amplifier 68 connected in the non-inverting configuration. Read level, erase level, and blanking level controls 17, 20, 31 respectively are included. Operational amplifier 68 is referenced to a source of potential which supplements the intensity control means of storage tube 1. Inputs from horizontal switch generator 14 and vertical switch generator 12 effectively switch the transistors such that when, say, the vertical switch input is low then transistor 62 is non conducting. Erase level control 20 can then be used to set the voltage at the input of the operational amplifier, thus the output level to the intensity read/write switch 15. Conversely, transistor 66 turns off and transistor 64 turns on to disconnect the read level control 17. A high signal from the vertical switch generator 12 disconnects the erase level control 20 and connects read level control 17. However, a signal from horizontal switch generator 14 can turn transistor 64 on or off for blanking and reading respectively. Storage target level control 10 can be, for example, the circuit shown in FIG. 5. As can be discerned from the drawings, FIGS. 4 and 5 are very similar, except, the operational amplifier of FIG. 5 is referenced to a source of potential which supplements the target of storage tube 1.

When erasure is desired, erase ramp generator 18 is connected to the vertical deflection means of storage tube 1 via vertical ramp switching 6 and vertical read/write switch 7 driving vertical deflection amplifier 8. A raster signal in the form, for example, of a 15,750 Hertz sawtooth may be applied to the respective vertical deflection means from erase ramp generator 18 while the horizontal raster signal as previously explained is applied to the horizontal deflection means of the storage tube. Simultaneously with the erase deflection of the vertical deflection means at the horizontal rate, the target is set to the proper voltage level for erasure via storage target less control 10, adjustable by erase level control 19, and the intensity control means of storage tube 1 is caused to change the electron beam of the tube to an erase level via intensity erase/read/blanking switch 13, adjustable by erase level control 20. As a result of this technique, the image stored on the target of storage tube 1 is erased in proportion to the intensity of the electron beam.

To write an image i.e., store, an input signal to be written is simultaneously applied to the horizontal read/write switch 4, vertical read/write switch 7 and the intensity read/write switch 15. In the case of a waveform to be written on the storage target of storage tube 1, the input to the horizontal read/write switch 4 would normally comprise a horizontal sweep, while the input to the vertical read/write switch 7 represents the amplitude of the waveform. During writing time, the input to intensity read/write switch 15 must control the intensity of the electron beam of the storage tube 1 within its appropriate writing range of intensities. Thus, during write time, the target of storage tube 1 is set to the proper target potential via storage target level control 10, adjustable by write level control 21, while the electron beam is controlled by the intensity write input signal.

Figure 2:
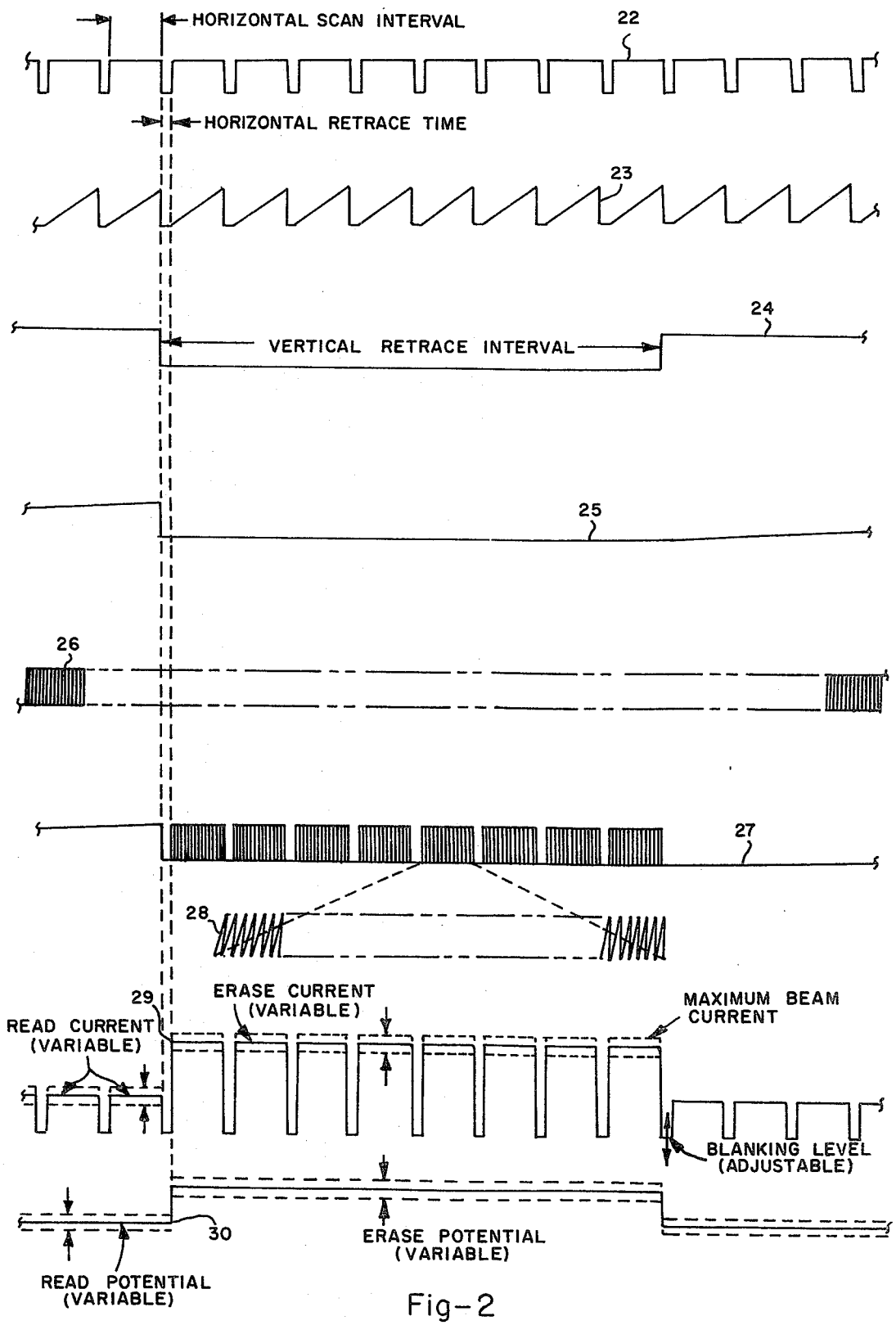
FIG. 2 is a series of waveforms illustrating operation of the apparatus fo FIG. 1.

To further understand apparatus operation, reference should be made to FIG. 2 in conjunction with FIG. 1. FIG. 2 shows various graphs of amplitude vs. voltage of the waveforms generated and routed within the apparatus of FIG. 1. Each graph has beem plotted so that a time relationship between each waveform exists. An exception is the waveform 28 which is a portion of the waveform 27 for purposes of clarity. Waveforms 22–30 are the outputs of the horizontal switch generator 14, horizontal read ramp generator 2, vertical switch generator 12, vertical read ramp generator 3, erase ramp generator 18, vertical deflection amplifier 8, intensity voltage amplifier 16, and storage target level control 10 respectively.

During the horizontal scan interval of the waveform 22, a portion of the waveform 24, labeled vertical retrace interval, and the waveform 26 is applied to the vertical deflection means of the storage tube 1 via vertical ramp switching 6 and vertical read/write switch 7 driving vertical deflection amplifier 8. This signal is the waveform 27 which is a composite of the already mentioned waveforms 22, 24, and 26 respectively. Simultaneously, the intensity control means is driven by a signal amplified by intensity voltage amplifier 16 and is the waveform 29. Also, the storage target level control 10 driven by vertical switch generator 12 produces the waveform 30.

As can be discerned from the waveforms 27, 29, and 30, erasure is accomplished during the horizontal scan interval portion of the vertical retrace interval by scanning the desired area and varying the electron beam density. Further enhancement, and thus faster erasing, can be accomplished by varying the target read level during normal read scan times as seen in the waveform 30.

While there has been shown and described the preferred embodiment of the present invention, it will be apparent to those skilled in the art tht many changes and modifications may be made without departing therefrom in its broader aspects. For example, the variable control 31 of FIG. 1 may be added to provide adjustable beam current corresponding to the blanking level for reasons well-known. Therefore, the appended claims are intended to cover all such changes and modifications as fall within the true spirit and scope of the invention.

The invention is claimed in accordance with the following:

1. A storage tube scan conversion system apparatus, comprising:
    a cathode-ray tube having a single electron gun and a storage target position to receive beam electrons admitted from such gun;
    means including a deflection system for causing said gun to write an electrical image on said storage target;
    means including a deflection system for causing said gun to produce successive readout patterns of said electrical image on said storage target;
    means including a deflection system for causing said gun to erase such electrical image on said storage target;
    means for selectively preparing said storage target for writing, reading, and erasing;
    switch means for switching between said means for causing write, readout, and erase to provide variable persistence; and
    means responsive to variations of said readout pattern to provide an electric signal for use to visually produce such pattern.

2. The storage tube scan converison system apparatus according to claim 1 further including:
    means for receiving an input signal to produce said electrical signal for use to visually produce such pattern;
    generator means for controlling said switch means; and
    second generator means for causing said means for causing write, readout, and erase to produce such electrical signal for use to visually produce such pattern.

3. A variable persistence storage tube system apparatus, comprising:
    a cathode ray tube having a single electron gun and a storage target positioned to receive beam electrons emitted from said gun;
    first means for supplying a set of signals to said cathode ray tube to deflect said beam electrons over a surface of said target;
    second means under the control of said first means for varying said beam electrons being deflected over said surface to write or to read or to erase an image on said target;
    third means under the control of said first means for supplying a variable potential to said target for determining a write, or a read, or an erase potential, said variable potential being supplied simultaneously with a corresponding variation of said beam electrons; and
    means coupled to said target to provide an electrical output signal.

4. A method of operating a signal storage tube system apparatus, comprising:
    generating horizontal timing signals;
    generating vertical timing signals;
    generating horizontal and vertical sawtooth sweep signals from said horizontal and vertical timing signals to form a raster signal having retrace intervals therein;
    generating a sawtooth sweep signal not in synchronization with said horizontal and vertical sawtooth sweep signals;
    combining the non-synchronous sweep signal with said horizontal and vertical sawtooth sweep signals during said retrace intervals to provide a composite signal;
    applying said composite signal to said storage tube to deflect an electron beam in accordance with said horizontal, vertical, and non-synchronization sawtooth sweeps;
    combining said horizontal and vertical timing signals to provide a second composite signal;
    applying said second composite signal to said storage tube to control the intensity of said electron beam in accordance with said horizontal and vertical timing signals;
    applying said horizontal sawtooth sweep signal to said storage tube to deflect said electron beam in accordance with said horizontal sawtooth sweep signal; and
    applying said vertical timing signal to said storage target to set the operating potential of said target in accordance with said vertical timing signal.

5. The apparatus according to claim 4 wherein said electron beam is deflected and varied simultaneously with said setting of storage target potential.

* * * * *

UNITED STATES PATENT OFFICE
CERTIFICATE OF CORRECTION

PATENT NO. : 3,988,634
DATED : October 26, 1976
INVENTOR(S) : Denham/Biggs

It is certified that error appears in the above-identified patent and that said Letters Patent are hereby corrected as shown below:

Column 2, Line 26, "fo" should be --of--.
Column 2, Line 46, "However'," should be --However,--
Column 4, Line 23, "target less" should be --target level--
Column 4, Line 52, "beem" should be --been--
Column 5, Line 17, "tht" should be --that--
Column 5, Line 51, "converison" should be --conversion--
Column 6, Line 56, "The apparatus" should be --The method--

Signed and Sealed this twenty-third Day of August 1977

[SEAL]

Attest:

RUTH C. MASON
Attesting Officer

C. MARSHALL DANN
Commissioner of Patents and Trademarks